May 16, 1961 H. E. SCHULTZE 2,984,321
HYDRAULIC SHOCK ABSORBER WITH COMPRESSION CUT-OFF
Filed Nov. 20, 1959 2 Sheets-Sheet 1

INVENTOR.
Harold E. Schultze
BY
His Attorney

INVENTOR.
Harold E. Schultze
BY
His Attorney

United States Patent Office 2,984,321
Patented May 16, 1961

2,984,321

HYDRAULIC SHOCK ABSORBER WITH COMPRESSION CUT-OFF

Harold E. Schultze, Dayton, Ohio, assignor to General Motors Corporation, Detroit, Mich., a corporation of Delaware Filed Nov. 20, 1959, Ser. No. 854,489

4 Claims. (Cl. 188—88)

This invention relates to hydraulic shock absorbers and particularly to direct-acting type shock absorbers.

In the normal operation of hydraulic shock absorbers a valve piston operates in a cylinder to effect displacement of hydraulic fluid in opposite directions through the piston under control of the resistance valving in the piston. Also, the shock absorber is provided with a base valve in the cylinder which resists flow of hydraulic fluid from the cylinder but allows substantially free flow of fluid on return to the cylinder to and from a reservoir provided around the shock absorber cylinder.

Shock absorbers of this general type have the valving in the piston and in the base valve calibrated to take care of normal road shock conditions.

However, there are times when the vehicle on which the shock absorbers are mounted ride over an abnormal obstruction which causes high velocity movement of the shock absorber on compression stroke with the result the chassis of the vehicle strikes the bump stops provided on the vehicle for this purpose. This gives the passengers of the vehicle a severe jolt.

An object of the invention is to provide a hydraulic shock absorber with means in the compression chamber of the shock absorber to highly restrict, and practically cut off, flow of fluid from the compression chamber during a compression stroke of abnormal extent and thereby avoid the vehicle striking the bump stops provided on the axles of the vehicle. This is accomplished by providing an auxiliary cylinder in the compression chamber of the shock absorber in which an auxiliary piston operates. The peripheral surface of the auxiliary piston is tapered so that movement of the piston into the auxiliary cylinder gradually increases resistance to flow of fluid from the cylinder in the space provided between the outer periphery of the auxiliary piston and the inner surface of the cylinder until a substantial closure is made thereby increasing the resistance movement between the parts attached to the shock absorber during the compression stroke.

Another object of the invention is to provide a hydraulic shock absorber with increasing resistance to movement on the compression stroke wherein the increase of resistance is accomplished in stages, a first stage of resistance being a gradual increasing resistance, and a second stage being a relatively constant resistance. This can be accomplished by the use of a secondary cylinder within a primary cylinder of auxiliary cylinder means within the main compression chamber, the secondary cylinder being extensible above the level of the primary cylinder and movable into the primary cylinder of the auxiliary cylinder means with the auxiliary piston during the compression stroke.

Further objects and advantages of the present invention will be apparent from the following description, reference being had to the accompanying drawings wherein preferred embodiments of the present invention are clearly shown.

Figure 1:
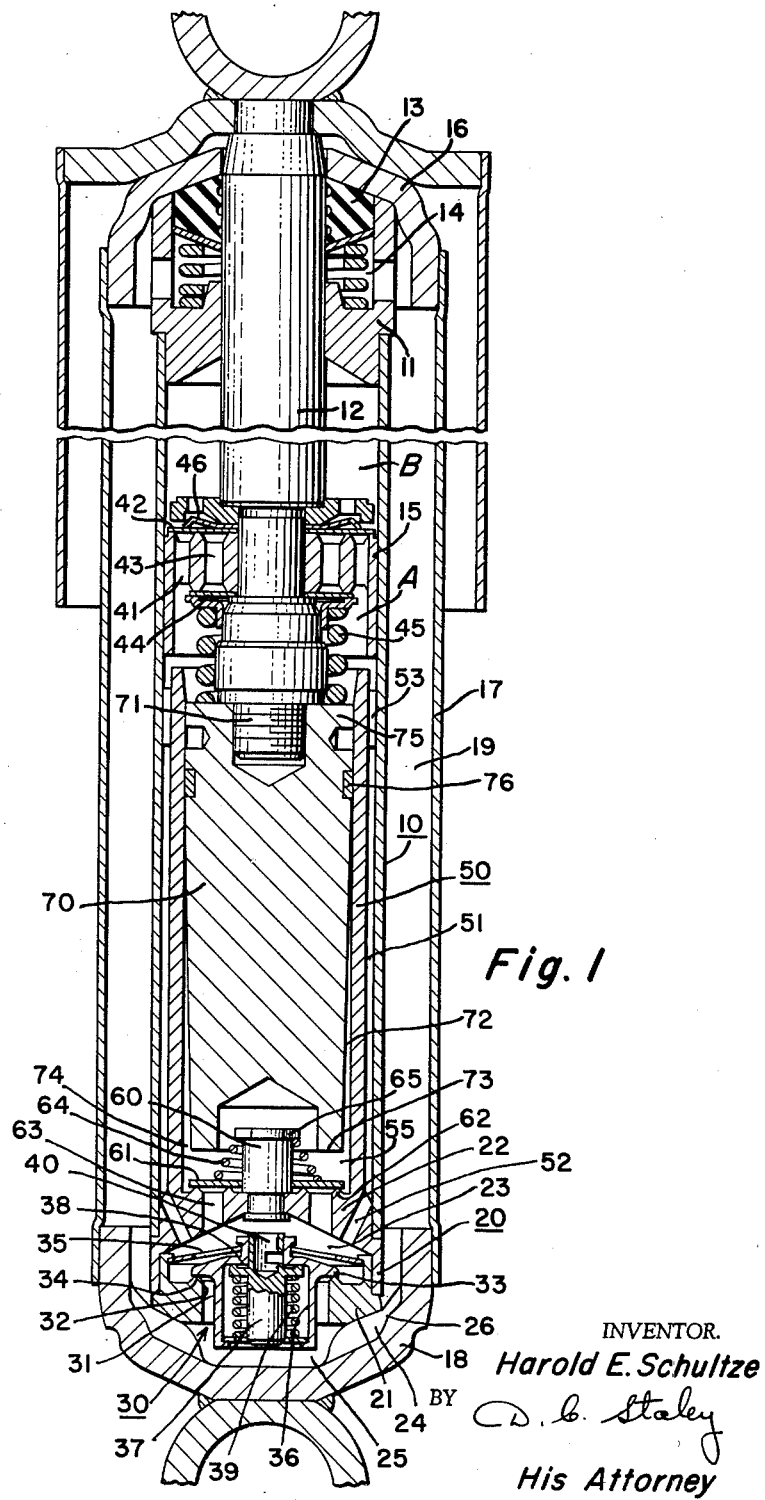
Fig. 1 is a vertical cross-sectional view of a hydraulic shock absorber incorporating features of this invention.

Referring to Fig. 1, the shock absorber consists of a cylinder tube 10 in which a piston 15 reciprocates. The cylinder 10 is closed at one end by a rod guide member 11 through which the actuating rod 12 extends, the rod 12 being connected with the piston 15. The rod 12 extends through a rod seal 13 that is retained in place in the seal chamber 14 by means of a closure cap 16.

The closure cap 16 carries a cylinder tube 17 spaced from the cylinder tube 10 and concentric therewith, the tube 17 being closed at its opposite end by a closure cap 18. The space between the tubes 10 and 17 forms a liquid reservoir 19.

The lower end of the shock absorber cylinder 10 is closed by a wall structure 20 that consists of a first wall portion 21 and a second wall portion 22 extending transversely of the cylinder tube 10, the wall portions 21 and 22 being in spaced relationship and forming therebetween a fluid receiving chamber 23. Wall portion 21 is supported on inwardly extending abutments 24 provided on the closure cap 18 to space the wall portion 21 from the closure cap and provide a fluid flow chamber 25 beneath the wall portion 21 and a flow passage 26 between the flow chamber 25 and the reservoir chamber 19.

The wall portion 21 supports a base valve structure 30 adapted to resist flow of hydraulic fluid from the cylinder tube 10 into the reservoir chamber 19 to allow substantially free flow of fluid from the reservoir chamber into the cylinder tube.

The valve structure 30 consists of a valve element 31 positioned within a bore 32 in the wall portion 21, the valve element 31 having a radially extending annular flange portion 33 that engages the valve seat 34 whereby to close the bore 32. A light finger spring 35 holds the valve element 31 on the seat 32 but provides little resistance against lifting the valve from the seat for flow of hydraulic fluid from the reservoir chamber 19 into the fluid receiving chamber 23 between the wall portions 21 and 22.

The valve structure 30 has an axial bore 36 that receives a valve element 37 seated against the valve seat 38 by the compression spring 39, an axial opening 40 providing for flow of hydraulic fluid from the chamber 23 against the upper side of the valve 37 and thence into the bore 36 for flow to the fluid reservoir 19. The compression spring 39 controls the point of opening of the valve 37.

The shock absorber piston 15 that is carried on the end of the rod 12 divides the shock absorber cylinder into a compression chamber A and a rebound chamber B, the upper end of the rod 12 normally being attached to the chassis of the vehicle while the lower end of the shock absorber is connected with the axle of the vehicle.

The piston 15 has a series of fluid flow passages 41 providing for flow of hydraulic fluid from the compression chamber A to the rebound chamber B under control of the valve 42. The piston 15 has a second series of fluid flow passages 43 providing for flow of hydraulic fluid from the rebound chamber B to the compression chamber A under control of the valve 44. A compression spring 45 controls the opening point of the valve 44 while a finger spring 46 controls the opening point of the valve 42.

The shock absorber thus far described will function in a substantially normal manner wherein movement of the piston 15 toward the base valve 30 will place fluid under compression in the chamber A on the compression stroke, excess fluid that is not displaced into the rebound chamber B through the valve 42 being discharged under pressure through the base valve 30 under control of the valve element 37, the volume of fluid flow through the base valve 30 being equivalent to the displacement of rod 12 that enters the rebound chamber B. On the return stroke or rebound stroke, fluid will flow from the rebound chamber B into the compression chamber A under control of the valve 44. Make-up fluid to fill the chamber A on movement of the piston 15 away from the base valve 30 will be received from the reservoir 19 through the bore 32 of the wall portion 21, valve element 31 opening against the light finger spring 35 for this purpose.

The shock absorber thus far described has no additional provision for restricting movement of the piston 15 into the cylinder 10 other than the normal valve action of the valves on the piston 15 and the valve in the base valve 30. Thus, when a severe compression stroke is encountered, the chassis of the vehicle can strike the bump stops on the axle of the vehicle.

To eliminate this condition, an additional means is provided for increasing the resistance to movement of the rod 12 and piston 15 into the compression chamber of the shock absorber. The means providing the additional resistance comprises an auxiliary cylinder means 50 that extends upwardly from the wall portion 22 at the bottom of the compression chamber. This cylinder means 50 has the exterior periphery thereof spaced from the inner periphery of the cylinder tube 10 thereby forming a passage 51 that connects the interior of the compression chamber A below the piston 15 with the fluid receiving chamber 23 between the wall portions 21 and 22, a passage 52 being provided in the wall portion 22 to complete the passage 51.

Spacer means 53 is provided at the upper end of the cylinder means 50 to support this end of the cylinder relative to the cylinder tube 10.

The auxiliary cylinder 50 provides an auxiliary cylinder chamber 55 in the lower end of the compression chamber A, the wall portion 22 closing the bottom end of the auxiliary cylinder 50.

The wall portion 22 supports a valve structure 61 that provides for flow of hydraulic fluid from the chamber 23 into the cylinder chamber 55, but prevents flow of fluid from the chamber 55. This valve structure includes a valve element 61 supported on the valve seat 62 provided around the opening 63 in the wall portion 22. A light compression spring 64 held in position by the locating stud 65 holds the valve element on its seat 62.

The piston 15 carries an auxiliary piston 70 that is supported and attached thereto by thread portion 71. The piston 70 has its outer periphery 72 tapered, that is having the contour of an inverted truncated cone so that the lower end 73 of the auxiliary piston 70 provides a substantial clearance space 74 between the periphery of the auxiliary piston and the inner surface of the auxiliary cylinder 50, whereas the upper end 75 of the auxiliary piston substantially closes this space. A piston ring 76 is provided adjacent the top of the auxiliary piston 70 to provide a substantially good seal of the space between the auxiliary piston 70 and the auxiliary cylinder 50.

As shown in Fig. 1, the shock absorber is illustrated with the pistons 15 and 70 being disposed in the maximum position on compression stroke, that is at the bottom of the compression stroke. When the shock absorber is in an "at rest" position, the lower end 73 of the piston 70 will be adjacent the upper end of the auxiliary cylinder 50.

On a compression stroke of the shock absorber, that is movement of pistons 15 and 70 toward the base valve 30, the auxiliary piston 70 moves downwardly into the auxiliary cylinder 50. As the piston 70 moves down, the clearance space 74 between the periphery of the piston 70 and the inner surface of the auxiliary cylinder 50 gradually decreases at the upper end of the auxiliary cylinder thereby increasing the resistance to flow of hydraulic fluid from the auxiliary compression chamber 55. Valve 61 prevents flow of hydraulic fluid through the wall portion 22. This flow of hydraulic fluid from the compression chamber 55 enters the main compression chamber A and then passes down through the passage 51 into the fluid receiving chamber 23 and applies its pressure upon the valve element 37 in the base valve 30 which opens at a predetermined pressure to control flow of hydraulic fluid into the reservoir 19.

As the auxiliary piston 70 approaches the bottom point of travel, illustrated in Fig. 1, the clearance space between the auxiliary piston and the cylinder 50 substantially prevents, or highly restricts, any further flow of hydraulic fluid from the auxiliary compression chamber 55, thereby imparting a very high resistance to further movement of the rod 12 of the shock absorber relative to the cylinder tube 10.

On return movement of the piston 15, that is on rebound stroke, or movement of the piston 15 away from the base valve 30, the auxiliary compression chamber 55 as well as the main compression chamber A will be supplied with make-up fluid from the reservoir 19 through the main base valve 30 by way of passage 51 to the main compression chamber A and through the valve structure 61 for the auxiliary compression chamber 55.

Figure 2:
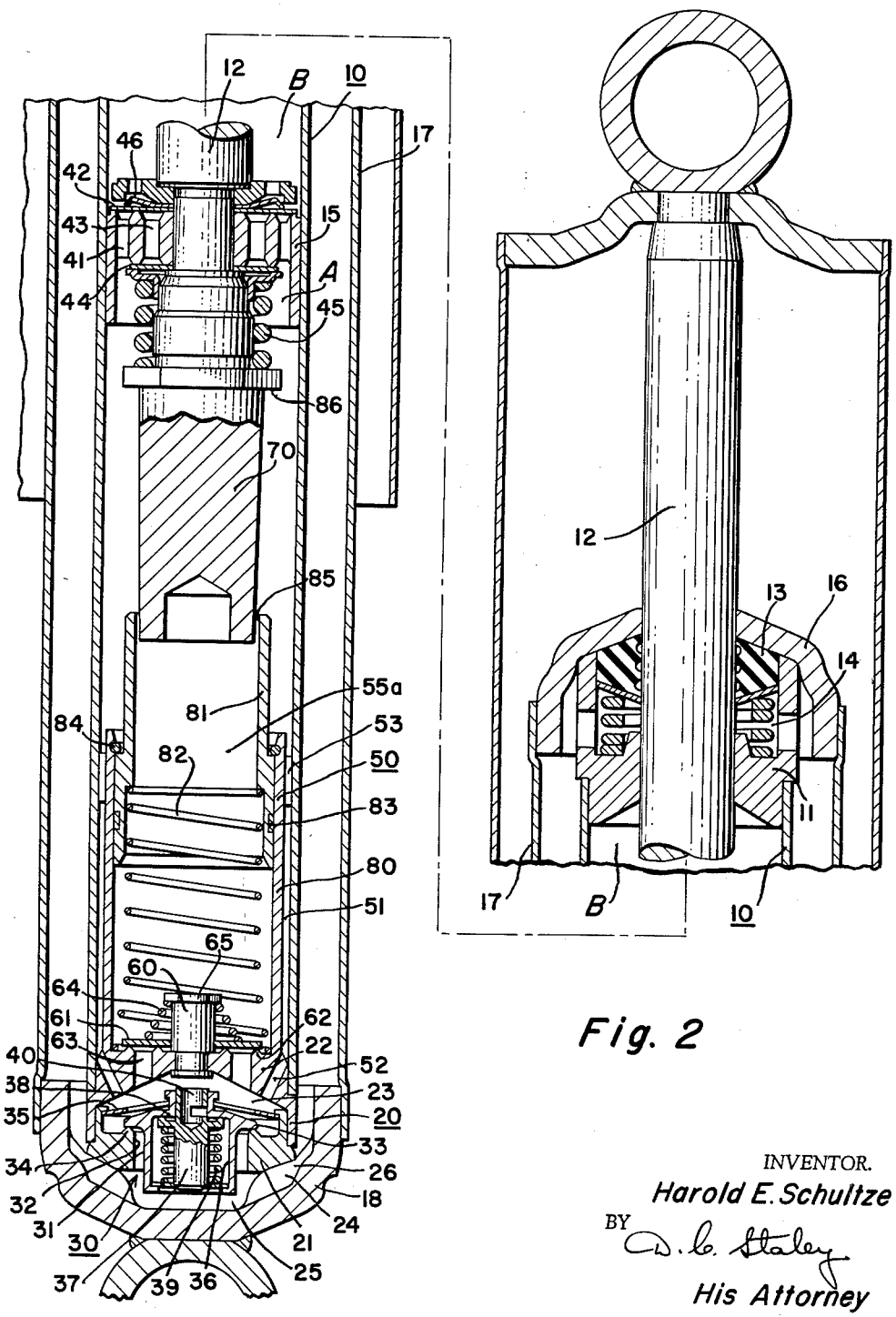
Fig. 2 is a vertical cross-sectional view of a modified form of a shock absorber incorporating features of this invention.

In Fig. 2 there is illustrated a modified form of the structure of the secondary cylinder means 50 wherein the secondary cylinder means consists of a primary cylinder 80 and a secondary cylinder 81, the auxiliary cylinder means 50 therefore being a composite structure instead of a single unit structure, as illustrated in Fig. 1.

Other than for the modified structure of the auxiliary cylinder means 50, the structure of the shock absorber illustrated in Fig. 2 is the same as that illustrated in Fig. 1 so that, where applicable, the same reference numerals are applied.

In Fig. 2, the auxiliary piston 70 is illustrated at substantially an "at rest" position or static position, as distinguished from the auxiliary piston 70 at the bottom end of its compression stroke as illustrated in Fig. 1.

In Fig. 2, the secondary cylinder 81 of the auxiliary cylinder means 50 has a compression spring 82 that urges the secondary cylinder into the position shown in the drawing. A piston ring 83 is provided between the secondary and primary cylinders of the auxiliary cylinder means. A stop member 84 limits the upward travel of the secondary cylinder 81 relative to the primary cylinder 80.

The arrangement of the device illustrated in Fig. 2 provides for staging of the resistance to movement of the shock absorber rod 12 into the cylinder tube 10 on the compression stroke. The first stage of resistance occurs as the piston 70 moves into the secondary cylinder 81 as it is positioned as shown in the drawing, the space 85 between the periphery of the piston 70 and the secondary cylinder 81 gradually decreasing as the piston 70 enters the secondary cylinder. This gradually increases resistance to flow of hydraulic fluid into the compression chamber A and thereby increases the resistance to movement of the rod 12 into the cylinder tube 10.

The secondary cylinder 81 is maintained in its extended position, as shown in Fig. 2, during the time the auxiliary piston 70 is moving into the secondary cylinder since the pressure of hydraulic fluid in the auxiliary compression chamber 55a is effective on the exposed bottom area of the secondary cylinder, constantly urging it upwardly into its extended position, there being a pressure differential between the chamber 55a and the chamber A by reason of the increasing resistance through the clearance space between the periphery of the piston 70 and the secondary cylinder 81.

When the secondary piston 70 enters the secondary cylinder 81 fully, the upper end of the secondary cylinder will seat on the horizontal shoulder 86 on the auxiliary piston 70 thereby cutting off flow of hydraulic fluid from the chamber 55a into the chamber A. As the piston 70 and cylinder 81 now move downwardly together, there will be a very high resistance to flow of hydraulic fluid from the chamber 55a thereby effecting a hydraulic control over movement of the shock absorber rod 12 into the cylinder tube 10 to such an extent as to substantially eliminate engagement of the bump stops by the chassis of the vehicle.

On rebound stroke, the apparatus of Fig. 2 obtains its make-up fluid for the auxiliary compression chamber 55a and the main compression chamber A in the same manner as heretofore described with reference to Fig. 1.

While the embodiments of the present invention as herein disclosed constitute a preferred form, it is to be understood that other forms might be adopted.

What is claimed is as follows:

1. In a hydraulic shock absorber, first cylinder means having wall means at each end thereof closing the first cylinder means, piston means reciprocable in said first cylinder means dividing the first cylinder into a compression chamber and a rebound chamber, said first piston means having valve means controlling flow of fluid through said first piston means in opposite directions of flow on opposite reciprocable movement of the piston means in said first cylinder means, auxiliary cylinder means in the compression chamber of said first cylinder means and extending longitudinally thereof for a part of the length of the said compression chamber, second wall means closing one end of said auxiliary cylinder adjacent the wall means closing the compression chamber of said first cylinder means, auxiliary piston means connected to said first piston means for movement therewith and cooperating with said auxiliary cylinder and said second wall means closing one end thereof to form therewith auxiliary compression chamber means, means forming passage means by-passing fluid flow from said first-mentioned compression chamber around said auxiliary cylinder and the auxiliary compression chamber formed thereby, fluid reservoir means receiving fluid from said compression chambers and from which fluid is returned to the said compression chambers, first valve means in the wall means closing said first compression chamber providing for restricted flow of fluid therefrom to said reservoir and substantially unrestricted return flow, and second valve means in said wall means closing said one end of said auxiliary cylinder therethrough on movement of the auxiliary piston means into said auxiliary cylinder means and substantially unrestricted return flow into said auxiliary cylinder on reverse movement of the auxiliary piston means, movement of said auxiliary piston means into said auxiliary cylinder means effecting compression of fluid in said auxiliary cylinder means with controlled restricted release of the fluid under compression therein, said auxiliary cylinder means comprising a secondary cylinder means slidable in a primary cylinder means with the secondary cylinder means being extensible beyond the terminus end of the primary cylinder means and into which said auxiliary piston enters to form with said auxiliary cylinder means said auxiliary compression chamber means.

2. In a hydraulic shock absorber, first cylinder means having wall means at each end thereof closing the first cylinder means, piston means reciprocable in said first cylinder means dividing the first cylinder into a compression chamber and a rebound chamber, said first piston means having valve means controlling flow of fluid through said first piston means in opposite directions of flow on opposite reciprocable movement of the piston means in said first cylinder means, auxiliary cylinder means in the compression chamber of said first cylinder means and extending longitudinally thereof for a part of the length of the said compression chamber, second wall means closing one end of said auxiliary cylinder adjacent the wall means closing the compression chamber of said first cylinder means, auxiliary piston means connected to said first piston means for movement therewith and cooperating with said auxiliary cylinder and said second wall means closing one end thereof to form therewith auxiliary compression chamber means, means forming passage means by-passing fluid flow from said first-mentioned compression chamber around said auxiliary cylinder and the auxiliary compression chamber formed thereby, fluid reservoir means receiving fluid from said compression chambers and from which fluid is returned to the said compression chambers, first valve means in the wall means closing said first compression chamber providing for restricted flow of fluid therefrom to said reservoir and substantially unrestricted return flow, and second valve means in said wall means closing said one end of said auxiliary cylinder preventing flow of fluid from the auxiliary cylinder therethrough on movement of the auxiliary piston means into said auxiliary cylinder means and substantially unrestricted return flow into said auxiliary cylinder on reverse movement of the auxiliary piston means, movement of said auxiliary piston means into said auxiliary cylinder means effecting compression of fluid in said auxiliary cylinder means with controlled restricted release of the fluid under compression therein, said auxiliary cylinder means comprising a secondary cylinder means slidable in a primary cylinder means with the secondary cylinder means being extensible beyond the terminus end of the primary cylinder means and into which said auxiliary piston enters to form with said auxiliary cylinder means said auxiliary compression chamber means, said secondary cylinder means having an end area thereof exposed to the compressed fluid in the said auxiliary cylinder means to urge thereby said secondary cylinder means to its position of extension beyond said primary cylinder means during movement of said auxiliary piston means into said auxiliary cylinder means.

3. In a hydraulic shock absorber, first cylinder means having wall means at each end thereof closing the first cylinder means, piston means reciprocable in said first cylinder means dividing the first cylinder into a compression chamber and a rebound chamber, said first piston means having valve means controlling flow of fluid through said first piston means in opposite directions of flow on opposite reciprocable movement of the piston means in said first cylinder means, auxiliary cylinder means in the compression chamber of said first cylinder means and extending longitudinally thereof for a part of the length of the said compression chamber, second wall means closing one end of said auxiliary cylinder adjacent the wall means closing the compression chamber of said first cylinder means, auxiliary piston means connected to said first piston means for movement therewith and cooperating with said auxiliary cylinder and said second wall means closing one end thereof to form therewith auxiliary compression chamber means, means forming passage means by-passing fluid flow from said first-mentioned compression chamber around said auxiliary cylinder and the auxiliary compression chamber formed thereby, fluid reservoir means receiving fluid from said compression chambers and from which fluid is returned to the said compression chambers, first valve means in the wall means closing said first compression chamber providing for restricted flow of fluid therefrom to said reservoir and substantially unrestricted return flow, and second valve means in said wall means closing said one end of said auxiliary cylinder preventing flow of fluid from the auxiliary cylinder, said auxiliary cylinder means comprising a secondary cylinder means slidable in a primary cylinder means with the secondary cylinder means being extensible beyond the terminus end of the primary cylinder means and into which said auxiliary piston enters to form with said auxiliary cylinder means said auxiliary compression chamber means, said secondary cylinder means having an end area thereof exposed to the compressed fluid in the said auxiliary cylinder means to urge thereby said secondary cylinder means to its position of extension beyond said primary cylinder means during movement of said auxiliary piston means into said auxiliary cylinder means, said auxiliary piston means having means engaging said secondary cylinder means on movement of said auxiliary piston means a predetermined distance into said secondary cylinder means to effect thereby concurrent movement of said auxiliary piston means and said secondary cylinder means concurrently into said primary cylinder means during a part of the stroke of movement of said auxiliary piston means into said auxiliary cylinder means.

4. Hydraulic shock absorber means constructed and arranged in accordance with claim 2 that includes spring means between said secondary cylinder means and the wall means closing one end of said auxiliary cylinder means urging said secondary cylinder means to its position of extension beyond the primary cylinder means to said auxiliary cylinder means.

References Cited in the file of this patent
UNITED STATES PATENTS

| | | |
|---|---|---|
| 2,606,630 | Rossman | Aug. 12, 1952 |
| 2,783,859 | Patriquin | Mar. 5, 1957 |
| 2,907,414 | Patriquin | Oct. 6, 1959 |
| 2,924,304 | Patriquin | Feb. 9, 1960 |

FOREIGN PATENTS

| | | |
|---|---|---|
| 1,169,663 | France | Sept. 15, 1958 |